United States Patent [19]

Grotloh

[11] Patent Number: 4,490,836
[45] Date of Patent: Dec. 25, 1984

[54] SHUT-OFF VALVE

[75] Inventor: Karlheinz Grotloh, Winterthur, Switzerland

[73] Assignee: Sulzer Brothers Limited, Winterthur, Switzerland

[21] Appl. No.: 328,703

[22] Filed: Dec. 8, 1981

[30] Foreign Application Priority Data

Dec. 19, 1980 [CH] Switzerland .......................... 9394/80

[51] Int. Cl.³ ................................................ G21C 9/00
[52] U.S. Cl. .................................. 376/281; 137/599.2; 137/637.2
[58] Field of Search .......................... 137/599.2, 637.2; 376/277, 281, 283

[56] References Cited

U.S. PATENT DOCUMENTS

| | | | |
|---|---|---|---|
| 4,060,453 | 11/1977 | Schabert et al. | 376/283 |
| 4,066,498 | 1/1978 | Hoffmann et al. | 376/281 |
| 4,092,214 | 5/1978 | Schabert et al. | 376/281 |
| 4,238,290 | 12/1980 | Schabert et al. | 376/277 |
| 4,245,412 | 1/1981 | Schabert et al. | 376/277 |

Primary Examiner—Sal Cangialosi
Attorney, Agent, or Firm—Francis C. Hand

[57] ABSTRACT

The valve stem of the controlled shut-off valve has a lid and a piston movable in a cylinder. A first cylindrical chamber and a second annular chamber facing the lid are separated by a piston and connected to a low-pressure chamber by ducts extending in the housing of the shut-off valve and connecting lines connected to the ducts outside the housing. The first chamber is also connected to the inlet side of the shut-off valve via a duct extending in the housing and containing at least one control valve actuated by a control line. Closing valves are provided in the connecting lines. A throttle means having a fixed flow cross-section is disposed in the duct of the first chamber inside the housing. The duct of the second chamber has a fixed minimum cross-section.

10 Claims, 1 Drawing Figure

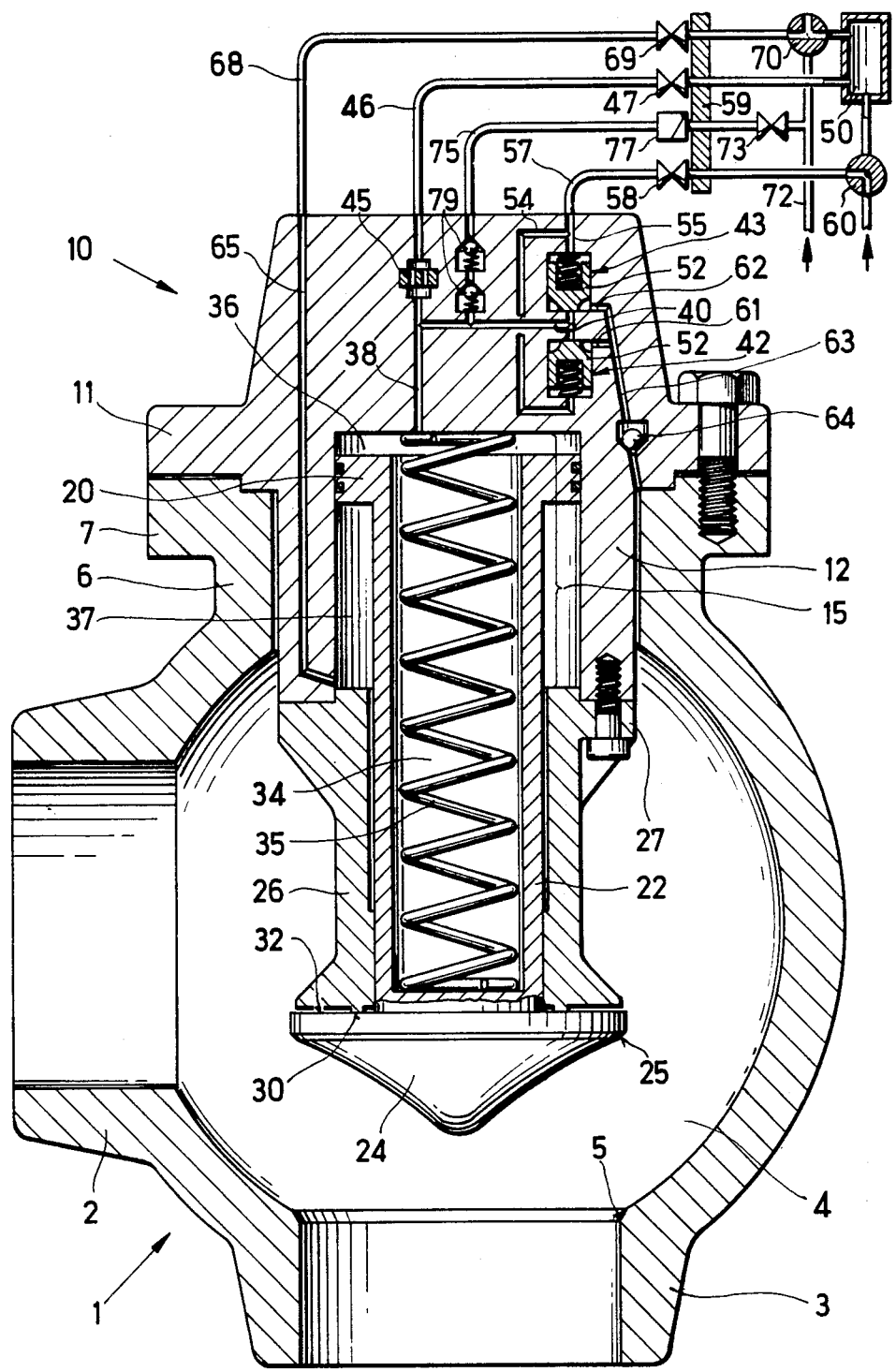

SHUT-OFF VALVE

This invention relates to a shut-off valve. More particularly, this invention relates to a shut-off valve which is controlled by the medium passing through the valve. Still more particularly, this invention relates to a vapor isolating shut-off valve for a nuclear reactor plant.

As is known, nuclear reactor plants have been provided with various types of shut-off valves for controlling a flowable medium. In many cases, the shut-off valves have been controlled by the medium passing through the valve. For example, as described in Swiss Pat. No. 528,693, one known valve employs three double acting valves in an insert in a housing cover of the shut-off valve. This valve provides good service but has the disadvantage of a complicated construction which places high requirements on the fabrication of the valve. In addition, the valve has been expensive to manufacture.

Accordingly, it is an object of the invention to provide a shut-off valve which can be simply constructed and which is reliable in operation.

It is another object of the invention to provide a low cost shut-off valve for use in a nuclear reactor plant.

It is another object of the invention to provide a low cost reliable shut-off valve which is controlled by the medium flowing through the valve.

Briefly, the invention provides a shut-off valve having a housing which defines a valve chamber and a cover mounted on the housing and defining a cylinder. In addition, the valve has a valve stem which has a lid at one end and a piston at the opposite end which is slidably disposed in the cylinder. The piston divides the cylinder into a first chamber on one side of the piston and a second chamber on the opposite side of the piston.

In accordance with the invention, various ducts extend through the cover to the respective chambers. That is, one duct extends from the first chamber through the cover to the outside, a second duct of fixed minimum cross-section extends from the second chamber through the cover to the outside and a third duct extends from the valve chamber through the cover to communicate with the first chamber. In addition, a fixed throttle means is disposed in the first duct within the cover while at least one control valve is disposed in the third duct within the cover.

Further, each of the first two ducts connect to connecting lines which extend to a low pressure chamber. Each of these connecting lines also has a closing valve to selectively connect the respective cylinder chambers to the low pressure chamber. In addition, a third connecting line extends from the control valve for controlling of the control valve.

One particular advantage of the valve construction is that, the use of the fixed throttle means in the duct from the first cylinder chamber eliminates the need for any valves in the cover. Further, due to the reduction in size of the sliding surfaces and the number of moving parts, a number of potential sources of breakdown are eliminated. This greatly increases the reliability of the valve.

Additional features can be added to the valve in order to provide additional redundance, so that the valve can be switched into both end positions when not under pressure, even if the control line is leaking. For example, a non-return valve is disposed in the duct between the valve chamber and the control valve and a connecting line is connected to the cover to communicate with the first chamber for delivering an external pressure medium into the chamber. In addition, a closing valve is provided in this connecting line for controlling flow therethrough and a non-return valve is provided in the cover in communication with the connecting line in order to prevent a return flow into the connecting line.

In addition, the connecting line leading from the control valve may also be provided with a closing valve for controlling the flow of the control medium therethrough.

When used with a nuclear reactor plant, the connecting lines may extend through a wall of the plant defining a containment vessel (safety container) and which separates the shut-off valve from the low pressure chamber. In this case, the closing valves for the connecting lines leading to the cylinder chambers and the control valve may be positioned adjacent to and within the wall of the plant and may be remotely controlled. In addition, a non-return valve can be provided in the fourth connecting line leading to the non-return valve in the cover. The closing valve for this line may also be disposed outside of the wall. In use, if a pipe breaks, no contaminating medium can escape from the containment vessel, through the lines for operating the shut-off valve.

The valve may also be provided with a redundant control valve in the third duct as well as with a cylindrical insert for mounting the two control valves within the cover in coaxial relation to each other. In this way, the control valve is protected from blockage by asymmetrical deformation resulting from thermal expansion.

These and other objects and advantages of the invention will become more apparent from the following detailed description taken in conjunction with the accompanying drawing wherein:

The FIGURE illustrates a schematic cross-sectional view of a shut-off valve construction in accordance with the invention.

Referring to the drawing, the shut-off valve has a housing 1 which is provided with an inlet spigot 2, an outlet spigot 3, a spherical valve chamber 4, a valve seat 5, a spigot 6 and a flange 7 about the spigot 6. In addition, the valve has a cover 10 mounted on the flange 7 of the housing 1 and which cooperates with the housing 1 to form a housing system.

The cover 10 includes a flange 11 which abuts the flange 7 of the housing and a wall 12 with which defines a cylinder within the valve chamber 4. As indicated, the wall 12 extends coaxially with the flange 11 and defines a cylindrical space 15.

The valve also has a valve stem 22 which has a mushroom-shaped lid 24 at one end and a piston 20 at the opposite end. This piston 20 is slidably disposed in the cylinder 12 to move axially within the cylinder space 15. As indicated, the piston 20 divides the cylinder space 15 into two chambers 36, 37. The upper chamber 36 as viewed, is of cylindrical shape while the lower chamber 27 is of annular shape.

The mushroom-shaped lid 24 includes a conical seat 25 for seating against the valve seat 5 at the outlet spigot. A cylindrical guide 26 has a flange 27 connected by bolts to the endface of the wall 12 in order to guide the valve stem 22. This guide 26 is also provided with a back seat 30 which cooperates with an appropriately machined shoulder 32 on the lid 24.

The valve stem 22 also has a blind bore 34 at the side facing the cover 10 which contains a compression spring 35. As shown, the spring 35 has one end abutting the base of the bore 34 and an opposite end abutting the cover 10 at the top end face of the cylinder space 15.

Hereinafter, the cylinder space above the piston 20, including the space in the bore 34, is called the "first chamber" 36 while the annular space between the underside of the piston 20 and the end face of the guide 26 is called the "second chamber" 37.

A duct 38 extends through the cover 10 from the first chamber 36 with one branch communicating via a fixed throttle means 45 in the cover 10 with a connecting line 46 outside the cover 10. This connecting line 46 contains a closing valve 47 and passes through a wall 59, for example, a wall of a containment vessel of a nuclear reactor plant, to a low pressure chamber 50 located outside the wall 59.

The throttle means 45 has a fixed aperture cross-section. To insure redundance, the throttle means 45 has two through-apertures since it is unlikely that two parallel openings will be simultaneously clogged. Depending upon the analysis of possible faults, a single throttle aperture can be provided, if required, downstream of a screen having a larger total aperture cross-section.

The duct 38 also connects via a transverse bore 40 to two chambers of two control valves 42, 43. Each control valve 42, 43 has an axially movable valve component 52 which is disposed in a chamber and which has a turned portion of quadrant cross-section at the end face outside a central flat sealing surface and a blind bore at the opposite end. Each blind bore contains a compression spring which bears against the end faces of the control valve chambers and which face away from each other. As indicated, the chambers of the control valves 42, 43 face away from each other and are connected via ducts 54, 55 to a connecting line 57 extending from the cover 10. The connecting line 57 contains a closing valve 58 adjacent to and within the wall 59 and passes through the wall 59 to a change-over valve 60. The change-over valve 60 has two spigots to connect the line 57 to a source of high pressure medium (not shown) or to the low pressure chamber 50.

A further duct 63 is disposed in the cover 10 and extends from the valve chamber 4. As indicated, the duct 63 contains a non-return valve 64 and connects via short connecting lines 61, 62 with the respective contoured end faces of the valve components 52 of the control valves 42, 43. When these control valves 42, 43 are open, the duct 63 is able to communicate with the first chamber 36 via the transverse bore 40 and duct 38.

A further duct 65 is also provided in the cover 10 to communicate with the second chamber 37 at the bottom end. This duct 65 leads to a connecting line 68 outside the cover 10 which line 68, in turn, extends through the wall 59 to the low pressure chamber 50 and contains a closing valve 69 adjacent to and within the wall 59. A change over valve 70 is also disposed in the line 68 to connect the line 68 to the low pressure chamber 50 or to a line 72 which supplies an external medium at high pressure.

A further external-medium connecting line 75 extends from the line 72 through the wall 59 via a closing valve 73 disposed outside the wall 59 and a non-return valve 77 within and adjacent the wall 59. The connecting line 75 communicates via a pair of non-return valves 79 within the cover 10 with the transverse bore 40 of the duct 38.

During normal operation, the shut-off valve is open, as viewed, and a hot pressure medium flows through via the spigots 2, 3. The shut-off valve remains in this position because, when the closing valve 58 is open, the connecting line 57 is filled with high pressure medium from the pressure medium source (not shown) via the change over valve 60 which is in the position shown. This pressure medium, assisted by the springs in the blind bores of the valves 42, 43, holds the valve components 52 in the closing position. As a result, the cylinder chamber 36 is connected to the low pressure chamber 50 and is relieved of pressure via the throttle means 45 and the open closing valve 47. The second chamber 37 is similarly connected to the low pressure chamber 50 and is relieved of pressure via the open closing valve 69 and the change over valve 70. The pressure of the medium in the valve chamber 4 acts on the cross-section inside the back seat 30 and maintains the shut off valve open against the force of the spring 35 and the weight of the entire movable lid system formed by the lid 24, the piston 20 and the stem 22.

If the valve is to be closed, the change over valve 60 is moved 90° clockwise from the illustrated position so that the connecting line 57 discharges to the low pressure chamber 50. Under the action of the pressure medium supplied through the duct 63 from the valve chamber 4, the valve components 52 move into the open position. At the same time, the medium from the valve chamber 4 flows from the duct 63 through the transverse bore 40, duct 38, throttle means 45 and closing valve 47 into a low pressure chamber 50. Another stream of medium also flows into the first chamber 36. If the flow cross-sections of the lines, valves and throttle means 45 are suitably adapted to one another, the pressure building up in the chamber 36 is near the pressure in the valve chamber 4.

Since the piston 20 has a greater outside diameter than the back seat 30 under the above mentioned pressure conditions, the lid 24 moves into a closing position whereupon the medium from the second chamber 37 is conveyed through the duct 65, connecting line 68 and open valve 69 into the low pressure chamber 50.

In order to reduce the loss of medium via the throttle means 45 and discharge line 46 into the low pressure chamber 50, the valve 47 can be closed at the same time as the change over valve 60 is switched over to the low pressure chamber 50.

If, after being closed by the pressure medium, the shut-off valve is to be again opened, the change over valve 60 is switched over to the illustrated position in order to supply external medium to the line 57. If the closing valve 47 has been closed, the valve 47 is now reopened. Since the pressure of the foreign medium in the connecting line 57 is higher than in the valve chamber 4, the two control valve components 52 move into the closing positions. Since a medium is now flowing from the duct 38 through the throttle means 45 and connecting line 46 to the low pressure chamber 50, whereas no pressure medium flows through the control valves 42, 43, the first chamber 36 is relieved of pressure.

If the pressure down stream of the shut-off valve is high enough compared with the low pressure in the chamber 50, the shut-off valve opens immediately. If this is not the case, the plug of the change-over valve 70 is rotated 90° counter-clockwise, as viewed. In this way, the external medium flows into the second chamber 37 via the open closing valve 69. As a result of the additional action of the external medium pressure in the second chamber 37, the shut-off valve now moves into the open position.

Depending on the conditions to be fulfilled by the shut-off valve, the diameters of back seat 30, piston 20 and stem 22 will be dimensioned in dependence on the diameter of valve seat 5 and the cross-section of the spring 35.

As a result of the aforementioned operations, the shut-off valve can be opened even if there is no pressure at the shut-off valve.

If the shut-off valve has to be closed when not under pressure and if the force of the spring 35, increased by the dead weight of the movable lid system, is insufficient to move the lid 24 when the valve 69 is open and valve 70 is in the illustrated position, the external medium can be introduced into the first chamber 36 via the connecting line 75, valve 73, valve 77 and the pair of non-return valves 79.

The shut-off valve is so constructed that if the control line 57 breaks, the shut-off valve moves into the closed position as required, e.g. in the case of isolating valves of nuclear reactor plants.

The non-return valve 77 and closing valves 69, 47 and 58 are disposed so that if a pipe breaks, any contaminated medium is prevented from escaping through the lines 68, 46, 75, 57 through the safety-vessel wall 59. An additional safety logic circuit acting on the closure valves can be used for this purpose for example.

The low-pressure chamber 50 can, for example, be the condenser of a steam turbine plant.

In addition to providing two apertures in the throttle means 45, redundance may also be obtained by providing a pair of non-return valves in parallel instead of the non-return valve 64.

The throttle means 45 is adapted to prevent pressure medium from escaping too quickly from the duct 38 if the connecting line 46 leaks and the shut-off valve has to be moved into the closing position. The throttle cross-section must be dimensioned accordingly. As a result, even if all the connecting lines break, the shut-off valve will occupy the closed position required for safety purposes.

If the springs in the control valves 42, 43 are suitably dimensioned and valve components 52 or a throttle aperture parallel thereto have sufficient radial clearance, the change-over valve 60 can be omitted and the control line 57 can be connected to the chamber 50 directly via the valve 58. As a result, when the valve 58 is closed, the pressure in the duct 63 builds up in the connecting line 57 due to leakage at the valve components 52. If the control line 57 is relieved from pressure by opening valve 58, the control valves 42, 43 open. Under the action of the springs disposed in the blind bores of the valve components 52 the valves 42, 43 close, if the valve 58 opens.

The closing valve 58 is very important from the safety standpoint. It may therefore be advantageous to associate the valve 58 with a redundant valve in parallel.

Of note, the closing valves 47, 48 and 69 and the non-return valve 77 can be disposed on the outside of the safety-vessel wall 59 so that they are always accessible and open to inspection.

The invention thus provides a shut-off valve which can be readily fabricated in a factory and which is reliable in use.

The invention provides a shut-off valve of simple construction which can be made at small costs without reducing reliability. To this end, the construction of the valve is simplified by disposing the closing valves in the connecting lines, by providing the throttle means with a fixed flow cross-section in a duct within the housing cover and by giving the duct associated with the second chamber a fixed minimum cross-section.

What is claimed is:

1. A shut-off valve comprising
    a housing defining a valve chamber;
    a cover mounted on said housing and defining a cylinder;
    a valve stem having a lid at one end and a piston at an opposite end slidably disposed in said cylinder to divide said cylinder into a first chamber on one side of said piston and a second chamber on an opposite side of said piston;
    a first duct extending from said first chamber through said cover;
    a second duct of fixed minimum cross-section extending from said second chamber through said cover;
    a third duct extending from said valve chamber through said cover to said first chamber;
    a fixed throttle means in said first duct;
    at least one control valve in said third duct;
    a first connecting line extending from said first duct;
    a second connecting line extending from said second duct;
    a third connecting line extending from said control valve for controlling said control valve;
    a low pressure chamber connected to said first connecting line and to said second connecting line;
    a first closing valve in said first connecting line to selectively connect said first chamber to said low pressure chamber; and
    a second closing valve in said second connecting line to selectively connect said second chamber to said low pressure chamber.

2. A shut-off valve as set forth in claim 1 which further comprises a non-return valve in said third duct between said valve chamber and said control valve, a fourth connecting line connected to said cover in communication with said first chamber for delivering an external pressure medium into said first chamber, a closing valve in said fourth connecting line for controlling flow therethrough, and a non-return valve in said cover in communication with said fourth connecting line to prevent a return flow into said fourth connecting line.

3. A shut-off valve as set forth in claim 2 which further comprises a non-return valve in said fourth connecting line located near said first closing valve and said second closing valve, and wherein each of said closing valves is remotely-controlled.

4. A shut-off valve as set forth in claim 1 which further comprises a redundant control valve in said third duct and a cylindrical insert within said cover containing said control valves in coaxial relation to each other.

5. A shut-off valve as set forth in claim 1 which further comprises a third closing valve in said third connecting line for controlling a flow of a control medium therethrough.

6. In combination,
    a wall of a nuclear reactor plant;
    a shut-off valve within said wall, said shut-off valve comprising
    a housing defining a valve chamber;
    a cover mounted on said housing and defining a cylinder;
    a valve stem having a lid at one end and a piston at an opposite end slidably disposed in said cylinder to divide said cylinder into a first chamber on one side of said piston and a second chamber on an opposite side of said piston;

a first duct extending from said first chamber through said cover;

a second duct of fixed minimum cross-section extending from said second chamber through said cover;

a third duct extending from said valve chamber through said cover to said first chamber;

a fixed throttle means in said first duct;

at least one control valve in said third duct;

a first connecting line extending from said first duct through said wall;

a second connecting line extending from said second duct through said wall;

a third connecting line extending from said control valve through said wall for controlling said control valve;

a low-pressure chamber outside said wall and connected to said first connecting line and said second connecting line;

a first closing valve in said first connecting line adjacent and within said wall to selectively connect said first chamber to said low-pressure chamber; and a second closing valve in said second connecting line adjacent and within said wall to selectively connect said second chamber to said low-pressure chamber.

7. The combination as set forth in claim 6 wherein each said closing valve is remotely-controlled.

8. The combination as set forth in claim 6 which further comprises a remote-controlled third closing valve in said third connecting line adjacent and within said wall to selectively connect said control valve to a pressure medium.

9. The combination as set forth in claim 6 which further comprises a non-return valve in said third duct between said valve chamber and said control valve, a fourth connecting line extending through said wall and connected to said cover in communication with said first chamber for delivering an external pressure medium into said first chamber, a closing valve in said fourth connecting line and outside said wall for controlling flow therethrough, and a non-return valve in said cover in communication with said fourth connecting line to prevent a return flow into said fourth connecting line.

10. The combination as set forth in claim 9 which further comprises a non-return valve in said fourth connecting line adjacent and within said wall.

* * * * *